July 4, 1967 H. OBERTHUR 3,329,471
BRAKING-FORCE REGULATOR
Filed June 2, 1966
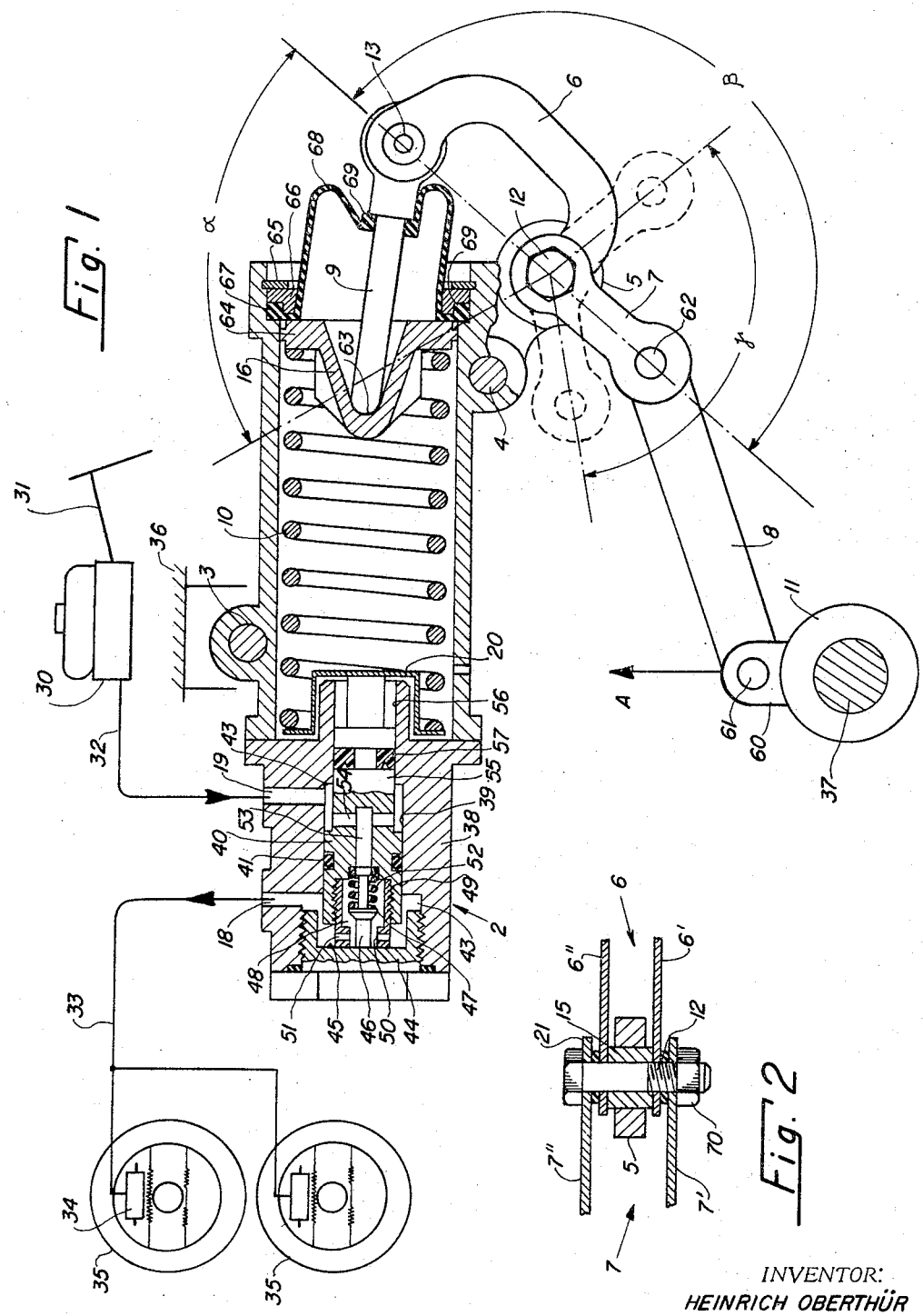
INVENTOR:
HEINRICH OBERTHÜR
BY
Ross & Mestern

United States Patent Office 3,329,471
Patented July 4, 1967

3,329,471
BRAKING-FORCE REGULATOR
Heinrich Oberthur, Offenbach-Rumpenheim, Germany, assignor to Alfred Teves, Offenbach-Rumpenheim, Germany, a corporation of Germany
Filed June 2, 1966, Ser. No. 554,800
Claims priority, application Germany, Sept. 17, 1965, T 29,422
5 Claims. (Cl. 303—22)

My present invention relates to a braking-force regulator of the motor-vehicle type and, more particularly, to a load-responsive regulator disposed in a brake system for varying the rate at which brake force is applied to the wheel brakes with actuation of a master cylinder in dependence upon the load upon the vehicle suspension.

In my U.S. Patents No. 3,169,800 and No. 3,233,947 issued Feb. 16, 1965 and Feb. 8, 1966, respectively, I disclose braking-force regulators of the general type disclosed above and controlled in response to the relative positions of the vehicle chassis and axle structures and thus in response to the load applied to the vehicle chassis or body. More particularly, the brake regulator of U.S. Patent No. 3,169,800 has a fluid-responsive coupling between the vehicle suspension and an abutment plate for a spring means acting upon a differentially displaceable piston, while U.S. Patent No. 3,233,947 provides a regulator housing which is swingably mounted upon the vehicle chassis and is coupled with the axle structure by means of a linkage for loading a spring means acting upon the regulator piston in accordance with the degree of compaction of the suspension (indicative of a large load) or expansion of the suspension (indicative of an unloaded state).

Basically, a brake regulator of the character described includes a valve means in a hydraulic path between the master brake cylinder and the fluid-responsive wheel cylinders of the vehicle, the valve means including a pressure-responsive movable member for controlling the flow of fluid from the master cylinder to the wheel brakes and (e.g. a differential piston) operable at a point in the characteristic of the brake system (when the actuating force at the master cylinder is plotted against brake pressure at the wheel cylinders, for example) to reduce the effective force applied to the wheel brake. Such a device is employed to prevent locking of the brake drum or disk at the indicated point in the characteristic of the brake system so that skidding or slipping of the wheel is precluded. As the load upon a vehicle increases, the braking force required prior to locking of the wheel increases correspondingly so that without a load-responsive brake regulator, the wheels of a vehicle tend to lock at a point at which the vehicle is only moderately slowed. It is imperative, therefore, that the load upon the vehicle be taken into consideration in brake regulators of the general character described.

It has been found that, while various load-responsive brake regulators have been proposed heretofore and such regulators have been coupled in various ways between the vehicle chassis and an axle structure, the linkage means for connecting the regulator housing to the chassis or the axle structures were relatively complex and had only limited freedom of adjustment. Moreover, an inclined arrangement of the regulator housing was frequently necessary and gave rise to spatial requirements for the regulator system which were extremely disadvantageous. In other prior-art arrangements, a lever arrangement was provided between the control valve and the vehicle axle, this lever being pivotally mounted upon the chassis and connected via a damping mechanism with the stem of the control valve to prevent the application of excessive force thereto during operation and loading of the vehicle. This arrangement was found to be satisfactory only with air-brake systems and has hitherto found no substantial utility in the hydraulic brake field.

It is, accordingly, an important object of the present invention to provide a load-responsive brake regulator which is relatively compact and of simple construction, and can be disposed conveniently between the vehicle chassis and an axle structure of the vehicle without difficulty.

A further object of this invention is to provide a compact regulator for the load control of the braking force applied to the wheel brakes of a motor vehicle in which the overall length of the system is reduced by comparison with prior art arrangements and which is readily adaptable to vehicles of many types without modification of the regulator structure.

A further object of this invention is to provide an improved brake regulator of the general type disclosed in the aforementioned patents and which is adjustable to suit various vehicle installations.

These objects have been attained, in accordance with the present invention, by means of a braking-force regulator which comprises a differential-piston-type valve system and disclosed in the aforementioned patents and provided with an axially extending stem; spring means yieldably bearing against this stem for applying thereto a restoring force designed to counter the force applied to the stem of the piston by hydraulic fluid upon the energization of the master-brake cylinder; and a double-arm lever fulcrumed upon the housing of the brake regulator and connected to one of the relatively displaceable members of the vehicle suspension (i.e. a chassis member or part secured thereto), one arm of this lever being linked to the respective suspension member while the other arm is coupled with the means for stressing the resilient means. Since the latter arm is of substantially invariable length, in accordance with this invention, the force transmission to the means for stressing the resilient means, e.g. a seat for the spring or springs, is always at the optimum position for force transfer no matter what orientation of the regulator or link means is employed. The same holds true for the provision of the fulcrum of the lever upon the regulator housing.

According to a further feature of this invention, the input arm of the lever is angularly settable with respect to the output arm thereof about the pivoal axis of the double-arm lever to accommodate the lever to various regulator configurations. Moreover, it has been found to be of considerable advantage to couple the input arm of the lever to the respective member of the suspension arrangement via a rigid link pivotally joined both to the input arm and to the respective suspension member.

According to a more specific feature of this invention, the brake regulator housing is of cylindrical construction and is fixed onto the chassis in a given orientation with respect thereto (i.e., is not swingable or otherwise movable relatively to the chassis) above the axle member of the suspension which is coupled with the double-arm lever via a single link element. The cylindrical housing structure receives at a forward portion thereof the differential piston-valve means whose stem extends axially into the spring-housing portion in which it bears against one seat of a compression spring whose other seat is a plate engageable by a pin or other force-transmitting member is, in turn, pivotally connected with the output arm of the lever, which can be of C-configuration with an opening in the direction of the regulator housing, while two coupling washers are receivably clamped between the arms of the lever by means of a bolt simultaneously forming the fulcrum for the double-arm lever in an eye, lug or bore of the housing.

The foregoing and other objects, features and advantages will become more readily apparent from the following description, reference being made to the accompanying drawing in which:

FIG. 1 is an axial cross-sectional view through a brake regulator, in accordance with this invention, showing the ancillary portions of the vehicle suspension and the corresponding portions of the hydraulic-brake system in diagrammatic form; and FIG. 2 is a cross-sectional view taken along the line II—II of FIG. 1.

In the drawing, I show diagrammatically a further brake system which comprises a master cylinder 30 operated by a pedal 31 and connected by a fluid conduit 32 to the fluid-valve means 2 of the brake regulator. The output port 18 of the brake regulator is connected to the wheel-brake cylinders via the conduits 33 (only one shown) which supply the wheel-brake cylinders 34 of the wheel brakes 35 of the vehicle. In addition, the vehicle is shown to comprise a chassis generally designated at 36 to which the regulator is secured, as will be described in greater detail hereinafter. The chassis portion 36 constitutes one member of a vehicle-body suspension whose other member is an axle housing 11 through which the axle 36 passes. The normal spring suspension is provided between the chassis 36 and the axle support 11 and can include compression springs, shock absorbers, leaf springs, tortion-bar springs or the like, such suspension means being conventional and requiring no significant discussion here.

As previously indicated, the valve means 2 of the brake regulator is of the type described in my above identified patents and includes a housing 38 whose cylindrical bore 39 slidably receives a differential piston 40 whose sealing ring 41 subdivides the bore 39 into a pressure chamber 42 communicating with the inlet port 19 and the conduit 32 and into a pressure chamber 43 communicating with the outlet port 18 and the conduit 33. Chamber 43 is closed by a plug 44 whose surface 45 at the forward end of bore 39 forms an abutment for a valve member 46 axially shiftable within the differential piston 42 and having a frustoconical valve portion 47 adapted to engage a valve seat 48. The latter is provided in a sleeve 49 threaded into the forward end of the piston 40 and defining a clearance 50 with the valve member 46; radial bores 51 communicate between this clearance and the chamber 43.

The valve member 46 is biased to the left against the abutment surface 45 by means of a relatively light-pressure coil spring 52 received within the sleeve 49. An axially extending bore 53 in the differential piston 40, communicates with the sleeve 49 and is supplied with fluid under pressure from the chamber 42 via the radial bores 54. The rearward extremity 55 of the piston 40 is of a diameter slightly less than the piston head and is sealingly received in the axially rearwardly open extension 56 of the bore 39 of the valve housing 38. A flange-type seal 57 ensures a fluid-type connection between the extremity 55 of the differential piston and the wall of bore 46. An axially extending stem 17 of the piston 40 projects rearwardly into a spring housing 1 of the brake regulator.

As set forth in the aforementioned patents, the actuating of the master cylinder 30 by means of brake pedal 31 forces hydraulic fluid under pressure through the conduit 32 and the port 19 into the chamber 39. Since the piston 40 is biased to the left by a strong force existing within the spring housing 1 and described in greater detail hereinafter, the valve member 46 is held against the force of spring 52 away from its seat so that the hydraulic fluid within chamber 42 can pass via bores 53 and 54, sleeve 49, clearance 50 and radial bores 51, into the chamber 43 whence it is supplied via outlet port 18 and conduit 33 to the wheel brakes 35; the force supplied at the wheel brakes is thus proportional to the force applied to the master cylinder 30.

As the fluid pressure in chambers 42 and 43 increases with increasing resistance of the brake cylinders 34 and increasing pressure upon the brake pedal 31, a larger total force is applied at the left-hand side of piston 40 (as a consequence of the relatively large area of the piston exposed in chamber 43) while a considerably lesser force is applied at the right-hand side of piston 40 (as a consequence of the relatively small area of the piston exposed in chamber 42). A net axial force to the right is applied to the piston 40 and, when the force of the spring means within the housing 1 is overcome, the piston 40 is shifted to the right and valve member 46 is permitted to close against the valve seat 48. Hydraulic fluid flow between the chambers 42 and 43 is thereby impeded and further application of pressure at the brake cylinder 30 permits the piston 40 to act as a membrane. In this case, there may be only the minutest further displacement of the piston 40 which transmits a force to the fluid in chamber 43 which is equal to the force applied in chamber 42. Since, however, the surface area of piston 40 exposed in chamber 43 is substantially larger, the pressure applied to the fluid in this chamber is reduced by comparison with the pressure supplied to chamber 42 and locking of the brakes is prevented because of the decreased rate of buildup of the braking pressure at the wheel cylinders from this point onward. It will be understood that the characteristic switch-over point is a function of the force-resisting movement of the piston 40 to the right and thus the preloading of spring 10.

In accordance with the principles of this invention, the valve means 2 and the spring housing 1 are coaxial with one another and connected together to form a rigid housing which is provided with mounting lugs 3 and 4 by means of which the brake regulator is secured to the vehicle chassis 36. At the rearward (right-hand) extremity of the cylindrical housing portion 1 there is provided a fulcrum lug or eye 5 within the bore of which a double-arm lever 6 and 7 is swingably mounted for coupling the brake regulator with the other member 11 of the suspension system.

In this arrangement, the axle housing 11 is provided with a lug 60 to which a link 8 is articulated at 61, this link being in turn swingably connected via a pin 62 with the input arm 7 of the double-arm lever mentioned above. The output arm 6 of this lever is of generally C-configuration and opens in the direction of the housing 1 while being pivotally secured at 13 to a force-transmitting pin 9. The latter extends into the housing 1 and bears with freedom of pivotal movement against a socket 63 of a spring plate 16. The latter has a flange 64 and defines a seat for the compression spring 10 which bears against a spring plate 20. The latter engages the stem 17 of the differential piston 40. A spring ring 65 retains a metallic support ring 66 against axial displacement to clamp the flange 67 of a rubber sleeve 68 against a shoulder 69 of the housing 1. The members 66 and 67 also form a stop in the extreme right-hand position of the spring plate 16. A collar 69 of the dust sleeve 68 snugly engages the pin 9.

During loading of the vehicle the axle housing 11 moves toward the brake regulator as represented generally by the arrow A with the movement of the axle being transferred via the link 8 and the lever 6, 7 to the pin 9 and, consequently, the spring seat 16. As shown in FIG. 1, the lever arms 6 and 7 are so oriented that the lines connecting the pivots of these arms with the fulcrum are coincident and thus at an angle $\beta$ of 180° with one another. A release of the bolt 12 will, as described below, permit relative movement of the arm 7 through an angle $\gamma$ between extreme positions with respect to the arm 6 whereby the relative angular positions of the arms 6 and 7 can easily accommodate to the particular location of the axle housing 11 with respect to the brake regulator 1, 2 and the desired end position of the plate 16. The pivot 13 of the arm 6 swings about the fulcrum defined by the bolt 12 through an angle α during the normal relative movements of the axle housing 11 with respect to the chassis upon loading and unloading of the vehicle. As the vehicle is loaded, therefore, the chassis 36 tends to lower toward the axle housing 11 which corresponds to a movement of the axle housing in the direction of arrow A and effects a swinging movement of the lever 6, 7 in the clockwise sense (FIG. 1) to increase the force required to overcome the spring 10 by the piston 40.

In FIGURE 2, I show the means for selectively locking the arms 6 and 7 of the double-arm lever in their relative angular positions as required. Thus, it will be seen that the lug 5 receives a clamping sleeve or bushing 15 which serves as a bearing but also has an axial length in excess of the thickness of the lug 5 so that the spaced-apart rods 6' and 6" (constituting the lever arm 6) can be locked against the sleeve 15. Outwardly of the elements 6' and 6" I provide a pair of toothed washers 21 which, in turn, engage the elements 7' and 7" of the arm 7. A bolt 12 passing through the elements of arms 6 and 7, the washers 21 and the bushing 15, can be tightened via a nut 70 to cause the washers to bite into the respective arms and lock them in any relative angular position in which they have been set.

The invention described and illustrated is believed to admit of many modifications within the ability of persons skilled in the art, all such modifications being considered within the spirit and scope of the appended claims.

I claim:

1. In a hydraulic brake system for a motor vehicle having a suspension including at least a chassis member and an axle member movable toward and away from one another upon variation in the load carried by the vehicle, a master cylinder, and a wheel-brake cylinder, the improvement which includes a braking force regulator comprising:

a housing mounted directly upon one of said members;
valve means in said housing forming a fluid connection between said master cylinder and said wheel-brake cylinder, said valve means being provided with a differential piston, and a valve operable upon movement of said piston to permit direct flow of fluid between said cylinders in one position of the valve and to effect force transmission across said piston between fluid acting on opposite sides thereof in another position of the valve;
spring means in said housing bearing on said piston with a force dependent upon the load applied to the vehicle; and
a double-arm lever pivotally mounted on said housing and having an input arm linked to the other of said members, and an output arm acting upon said spring means upon relative movement of said members toward one another,
said housing being mounted directly upon said chassis member and including a valve body slidably receiving said piston, and a cylindrical housing portion coaxial with said piston having a stem projecting into said cylindrical housing portion;
said spring means including a first plate bearing against said stem, at least one compression coil spring seated against said plate, and a second plate engaging said coil spring at an end of said cylindrical housing portion being open at said end;
and said regulator further comprising a force-transmitting element pivotally connected to said output arm of said double arm lever and acting upon said second plate for displacing same to stress said spring, and a rigid link pivotally connected to said input arm and coupled with said axle member, said housing being provided with a lug having a bore adjacent said end of said housing portion, a bolt received in said bore and pivotally mounting said double-arm lever upon said lug, said output arm of said lever being of C-configuration and open in the direction of said housing whereby the free end of said output arm can at least limitedly enter said housing portion, each of said arms including a pair of spaced-apart elements flanking said lug, said bolt passing through said elements of said arms, said regulator further comprising toothed washers disposed between each of the elements of one of said arms and a corresponding element of the other arm and clamped between said elements by said bolt to lock said arms in a predetermined relatively angular orientation about the axis of said bolt.

2. In a hydraulic brake system for a motor vehicle having a suspension including at least a chassis member and an axle member movable toward and away from one another upon variation in the load carrier by the vehicle, a master cylinder, and a wheel-brake cylinder, the improvement which includes a braking-force regulator comprising:

a housing mounted directly upon one of said members;
valve means in said housing forming a fluid connection between said master cylinder and said wheel-brake cylinder, said valve means being provided with a differential piston, and a valve operable upon movement of said piston to permit direct flow of fluid between said cylinders in one position of the valve and to effect force transmission across said piston between fluid acting on opposite sides thereof in another position of the valve;
spring means in said housing bearing on said piston with a force dependent upon the load applied to the vehicle; and
a double-arm lever pivotally mounted on said housing and having an input arm linked to the other of said members, and an output arm acting upon said spring means upon relative movement of said members toward one another, said arms of said double-arm lever are angularly movable about a common pivot, further comprising means for selectively locking said arms in a predetermined angular orientation with respect to one another.

3. The improvement defined in claim 2 wherein said means for locking said arms in said predetermined angular orientation includes a bore provided in said housing, a bushing rotatably received in said bore but projecting axially therefrom, a bolt passing through said bushing, said arms being clamped against said bushing by said bolt, and at least one toothed washer surrounding said bolt and received between said arms for preventing relative angular movement of said arms in a tightened position of said bolt but permitting relative angular movement of said arm upon loosening of said bolt.

4. The improvement defined in claim 3 wherein said brake regulator is disposed immediately above said axle member.

5. The improvement defined in claim 3, further comprising a pin pivotally connected to said output arm and extending into said housing for engagement with said spring means.

References Cited

UNITED STATES PATENTS

| | | | |
|---|---|---|---|
| 2,845,149 | 7/1958 | Stern et al. | 303—22 |
| 3,167,360 | 1/1965 | Oberthur | 303—6 |
| 3,233,947 | 2/1966 | Oberthur | 303—22 |

EUGENE G. BOTZ, *Primary Examiner.*